United States Patent Office 2,816,856
Patented Dec. 17, 1957

2,816,856

IMPROVEMENT IN PRODUCTION OF VITAMIN $B_{12}$ PRODUCTS BY PROPIONIBACTERIUM FREUDENREICHII

Jerry M. Sudarsky, Wasco, and Robert A. Fisher, Bakersfield, Calif., assignors to Pacific Yeast Products, Inc., Wasco, Calif., a corporation of California No Drawing. Application July 27, 1954, Serial No. 445,948

9 Claims. (Cl. 195—96)

Our invention relates to the production of substances having high vitamin $B_{12}$ activity by cultivation of a particular type of Propionibacterium in culture media of the type and under conditions such as are described in detail below. In its more specific and particularly important embodiments, it encompasses a method for the manufacture of vitamin $B_{12}$ supplements and concentrates by an economical and simple procedure which utilizes molasses as the source of carbohydrate and autolyzed waste brewer's yeast as the sole components of the culture medium and aqua ammonia as the neutralizing agent which can be carried out with conventional fermentation equipment.

While numerous methods have heretofore been suggested for the production of vitamin $B_{12}$ products, there are at the present time only three such revealed methods for primary vitamin $B_{12}$ production which are in present commercial use, namely, (1) the *B. megatherium* method (Ind. Eng. Chem., 45, 838 (1953)), (2) the *Streptomyces olivaceous* procedure (Ind. Eng. Chem., 46, 238 (1954)), and the sewage sludge extraction method (U. S. Pat. No. 2,646,386). All of these methods have one or more important practical limitations which our present invention overcomes. All of said prior methods are deficient, for instance, in relation to the yields of vitamin $B_{12}$ activity which they are capable of producing. None of them is capable of producing products for use in pharmaceutical preparations without resort to extraction procedures which are costly and time consuming. Yields of the order of about 4 to about 20 milligrams of vitamin $B_{12}$ activity per pound, on the weight of the dried crude fermentation product, generally characterize the results of practicing the aforesaid commercial processes.

The practice of our invention results in the production of stable vitamin $B_{12}$ products of exceptional quality, unusually high potencies and this is effected by means of a simple manufacturing procedure which utilizes cheap by-products as raw materials. Products made pursuant to the teachings of our invention contain, based on the dried crude fermentation products, of the order of 50 to 60 milligrams of vitamin $B_{12}$ activity per pound and, in many cases, substantially in excess thereof, namely, 80 to 200 milligrams and even materially higher.

The production of vitamin $B_{12}$ active compounds by fermentations involving the use of various propionic acid bacteria, including *Propionibacterium freudenreichii*, has also heretofore been proposed. Such heretofore known procedures have, however, not been found to be commercially practicable. It is important to understand that there are various criteria to be satisfied in any commercially workable method. One of these involves the property or characteristic in the bacteria to enable the whole culture to be possessed of characteristics which enable it to be feasible to effect separation of the bacteria from the medium by economical means, notably by centrifugal force. Other important considerations in evolving a commercially feasible vitamin $B_{12}$ method center around the substrates and the organic supplements utilized therein. Here, for instance, previously suggested Propionibacteria fermentation procedures have been found lacking, particularly from the viewpoint of the economics of the method as a whole. Again a fully commercially satisfactory method must be capable of producing initial crude products of high potencies of vitamin $B_{12}$ products within reasonable fermentation periods of time and, moreover, such crude products must be of such nature as to lend themselves well to extraction procedures in those instances where it is desired to produce vitamin $B_{12}$ concentrates.

In accordance with our invention, the fermentation is carried out by means of a particular species of propionic acid bacteria, namely, *Propionibacterium freudenreichii*, in conjunction with the utilization of particular types of substrates and particular types of organic supplements, all as is hereafter described in detail. The practice of our invention, which has been demonstrated by plant scale commercial operations, brings about a number of important advantages. In the first place, as has been stated above, stable products are produced which have high-potency vitamin $B_{12}$ activity which are substantially devoid of pseudo or inactive vitamin $B_{12}$ variants and such products have a relatively pleasant taste, odor and color, are free flowing and non-hydroscopic, can be admixed directly with foods and feeds, can be used in pharmaceutical preparations without further processing and concentration, and are ideally suited for the preparation of crystalline vitamin $B_{12}$ and concentrates. Secondly, the practice of our method does not require the use of the large volume of air needed by various other procedures and, therefore, expensive air dispersion devices are not used. Thirdly, it is not necessary to resort to evaporation, extraction and absorption steps in order to produce a high-potency product and, moreover, no spray drying equipment is needed. Fourthly, the nuisance of bacteriophage and actinophage contamination, common to many known processes, is avoided. Additional advantages which are brought about by our invention are that no symbiotic organisms are required to enhance the vitamin $B_{12}$ yield or otherwise to aid the economic aspect of the method, and no trace minerals need be added to the medium in order to promote growth of the aforesaid Propionibacterium and to develop the vitamin $B_{12}$ activity. Again, the utilization of expensive and refined sugars such as dextrose or lactose is unnecessary. Furthermore, the use of distillers' solubles is unnecessary, thereby avoiding difficult quality control problems. Since our method is a pure culture primary fermentation procedure, the quality of the vitamin $B_{12}$ activity is most uniform; and since our method is an intracellular one, namely, in which the vitamin $B_{12}$ activity is present in and recovered from the crude fermentation solids as distinguished from the fermentation broth, recovery procedures are greatly simplified.

The method of our invention involves the employment of certain ingredients and a series of correlated procedural steps which, in combination, bring about the results which we have described above. The specific bacterium which we utilize is *P. freudenreichii*, as pointed out above (see Bergey's Manual of Determinative Bacteriology, 6th edition, Williams and Wilkins Co.). The nutrient medium consists solely or essentially of molasses, which may be beet molasses, blackstrap molasses, or carrot molasses (derived as a by-product in the treatment of carrots to recover carotene therefrom), and a yeast product. The yeast product may comprise an extract or autolysate of a primary yeast but it is particularly desirable to prepare the extract or autolysate from liquid waste brewer's yeast. In this latter case, it is important to remove the hop resins by suitable washing procedures or the like since they interfere with the subsequent fermentation procedure. Of particular utility is an autolysate prepared from washed liquid waste brewer's yeast. The sugar content of the molasses used should be converted or inverted and, to this end, the yeast product, such as the autolyzed waste brewer's yeast should not be subjected to treatments, such as pasteurization at unduly elevated temperatures, which destroy the normal invertase content thereof. In those cases where the yeast product used does not contain invertase or contains insufficient invertase, an extraneous source of invertase can be added. The fermentation is carried out under conditions of gentle agitation, and certain temperature and pH controls, as hereafter pointed out. After substantially maximum vitamin $B_{12}$ activity has developed, the whole culture is centrifuged and the resulting bacterial cell cream is washed with water and recentrifuged. The washed cell cream is dried, advantageously on an atmospheric drum drier. The final product, as stated above, usually contains from 50 up to several hundred milligrams of vitamin $B_{12}$ activity per pound as determined by the protozoa assay procedure described by J. E. Ford, British Journal of Nutrition (1953), which assay distinguishes between vitamin $B_{12}$ active compounds and biologically inactive vitamin $B_{12}$-like pigments.

Over and above the importance of producing good yields of high quality vitamin $B_{12}$ active compounds substantially free of pseudo $B_{12}$ and other inactive variants, our method also has the vital advantages of economy and simplicity. Extracts or autolysates derived from waste liquid brewer's yeast and beet or blackstrap molasses, which advantageously comprise the sole components of the nutrient media, are cheap materials. The waste liquid brewer's yeast is washed, screened, and autolyzed, for instance, by heating at about 44 degrees C. for about 12 hours, and the autolysate is separated from the residual cells by centrifugation. Various methods known in the art can be used, if desired, to produce the yeast autolysate but we prefer to utilize the above described procedure. The yeast autolysate may be evaluated by means of an amino nitrogen titration. A value of 0.048% amino nitrogen is equivalent to 1% yeast autolysate solids "Yeastamin" (Vico Products Company). A primary yeast autolysate can be used, and it is also possible to use bakers' yeast or dried primary yeast if enough yeast is added to correspond to an amino nitrogen content in the medium of about 0.048% to about 0.24%. Also, yeast extracts can be used made from about 1% to about 10% yeast, based on the weight of the medium. The especially preferred source of organic supplement is, however, waste brewer's yeast autolysate since this supplies all of the organic nitrogen, invertase, growth factors and unknown substances needed simply and at minimum cost.

It will be seen, from the foregoing, that the medium needs nothing other than the molasses substrate and the yeast autolysate or the like. While supplemental materials may be added, they are unnecessary to the successful practice of our invention. The autolysate and molasses are admixed, heated to about 45 degrees C. and the pH adjusted to between .5 and 5.5. Enough invertase is present in the yeast autolysate to invert the dissacharides present in the molasses but, as stated above, if this is not the case, extraneous invertase may be added. Inversion is substantially complete in about an hour or so in the usual case. The culture medium advantageously consists of about 4% to about 18% molasses, with about 6% to about 12% constituting a particularly preferred range; and from about 1% to about 5% of yeast autolysate solids, with about 2% to about 3% constituting a particularly preferred range, said percentages being by weight of the culture medium or substrate as a whole. The culture medium, prepared as described above, is sterilized by passage through a continuous sterilizer at about 148 degrees C. for about 12 seconds, cooled to about 28 to 32 degrees C., and charged into a fermenting tank, advantageously sterile fermenting tank, equipped with an agitator to give gentle movement to the liquid. A 5% to 10% inoculum is usually used and the fermentation is carried out at 28 to 32 degrees C., particularly 30 degrees C., with the pH adjusted between about 6.5 and about 7.2 preferably by means of ammonium hydroxide. The fermentation is usually complete in 72 to 96 hours with a resulting vitamin $B_{12}$ activity yield of 3 to 6 milligrams of vitamin $B_{12}$ activity per liter, depending upon the amount and quality of molasses and yeast autolysate used. The whole culture is passed through yeast type centrifugal separators and the bacterial cells are harvested. The resulting cell cream is diluted with wash water, and the suspension is reseparated. This washing procedure may be carired out as often as necessary depending on the amount of fermentation residue remaining with cells. The cell cream is then dried advantageously on an atmospheric drum drier, using a steam pressure between about 40 and about 100 pounds per square inch. The flakes coming off the drums are ground and screened to the desired particle size.

The following examples are illustrative of the practice of our invention but are not to be construed as limitative since certain changes can be made therein in the light of the guiding principles disclosed herein without departing from the spirit of the invention.

Example 1

(a) 6000 gallons of fresh liquid waste brewer's yeast containing 12.2% solids were screened through a 100 mesh vibrating screen in order to remove hop resins and other debris. The resulting 5975 gallons of screened yeast were heated to 44 degrees C. and stored, with gentle agitation, for 10 hours to effect autolysis. The resulting autolyzed yeast slurry was subjected to a separation by passing through yeast separators where the residual undissolved yeast matter was removed. The clear yeast autolysate, comprising 4000 gallons containing 6% solids, contained 1992 pounds of yeast autolysate solids. Said autolysate was mixed with 8000 pounds of beet molasses, the volume was adjusted with water to 10,200 gallons and the pH of the mixture was adjusted to 5.1 by the addition of sulfuric acid. Live steam was injected to heat the mixture to 45 degrees C. After 1 hour, during which complete sugar inversion had taken place, the mixture was heated to 80 degrees C. and then passed through a continuous flash sterilizer which held the medium at 143 degrees C. for 12 seconds. After passage through a heat exchanger, the mixture was charged into a 15,000 gallon capacity fermentation tank at 30 degrees C. The pH of said solution or medium was adjusted to 7.0 by the addition of aqua ammonia and the tank was inoculated with 600 gallons of a 48 hour old culture of P. freudenreichii.

(b) The fermentation was allowed to progress for 96 hours at 30 degrees C. under conditions of gentle agitation, the pH being adjusted by means of periodic additions of aqua ammonia to maintain it between 6.5 and 7.0. An internal pressure of 5 pounds per square inch was held in the tank at all times. At the end of the 96 hours the whole culture assayed at 17.0 milligrams vitamin $B_{12}$ activity per gallon. The total vitamin $B_{12}$ activity produced was 194,000 milligrams. The whole culture was then centrifuged by means of yeast type separators. The cell cream amounted to 1120 gallons. The cell cream was dried on a double drum atmospheric drier at 55 pounds per square inch gage steam pressure. The final yield was 1002 pounds of powder assaying at 175 milligrams of vitamin $B_{12}$ activity per pound.

Example 2

(a) 100 grams of a dried soluble autolyzed brewer's yeast extract (e. g. "Yeastamin," Vico Products Company) and 120 grams beet molasses were dissolved in one liter of distilled water. The pH of the mixture was adjusted to 5.0 with sulfuric acid, and 5 ml. invertase (Nutritional Biochemicals technical preparation) was added. The mixture was heated to a temperature of 45 degrees C. for a period of one hour to effect inversion of the sucrose content of the beet molasses. The pH of the mixture was then adjusted to 7.0 with aqua ammonia. 40 grams U. S. P. precipitated chalk was suspended in the mixture as a buffer, and distilled water was added to dilute the mixture to 2 liters. The mixture was then transferred to a 4 liter fermentor which was equipped with suitable devices for aseptic agitation, addition of neutralizing agents and withdrawal of samples. The fermentor and its contents were sterilized by heating at 15 lbs. steam pressure for 90 minutes in an autoclave. After cooling to 30 degrees C., the fermentor was inoculated with 100 ml. of a 48 hour culture of P. freudenreichii.

(b) The fermentation was allowed to progress until all of the sugar had been consumed, which required a period of about 96 hours at 30 degrees C. under conditions of gentle agitation. The pH was adjusted to 7.0 at 4 hour intervals with aqua ammonia. At the end of the 96 hours, the whole culture assayed 4.5 milligrams vitamin $B_{12}$ activity per liter. The whole culture contained 7.4 grams cell solids per liter.

What we claim as new and desire to protect by Letters Patent of the United States is:

1. A method of producing physiologically active vitamin $B_{12}$ compounds which comprises providing an aqueous medium containing as essential ingredients inverted molasses and a yeast product, the molasses comprising from about 4% to about 18%, and the yeast product being present in amount to provide an amino nitrogen content of about 0.048% to about 0.24%, said percentages being by weight of the medium, inoculating said medium with a culture of P. freudenreichii and fermenting for a period of several days to develop vitamin $B_{12}$ activity.

2. A method of producing physiologically active vitamin $B_{12}$ compounds which comprises providing an aqueous medium containing as essential ingredients inverted molasses and yeast autolysate, the molasses comprising from about 8 % to about 16%, and the yeast autolysate solids comprising from about 2% to about 3%, said percentages being by weight of the medium, inoculating said medium with a culture of P. freudenreichii, and fermenting for a period of several days under conditions of agitation to develop vitamin $B_{12}$ activity.

3. A method of producing physiologically active vitamin $B_{12}$ compounds which comprises providing an aqueous medium containing as essential ingredients inverted molasses and brewer's yeast autolysate, the molasses comprising from about 8% to about 16%, and the yeast autolysate solids comprising from about 1% to about 5%, said percentages being by weight of the medium, inoculating said medium with a culture of P. freudenreichii, and fermenting for a period of several days under conditions of agitation to develop vitamin $B_{12}$ activity, centrifuging the whole culture, and drying the cell cream.

4. A method of producing physiologically active vitamin $B_{12}$ compounds which comprises providing an aqueous medium containing as essential ingredients inverted molasses and waste brewer's yeast autolysate, the molasses comprising from about 8% to about 12%, and the yeast autolysate solids comprising from about 2% to about 3%, said percentages being by weight of the medium, inoculating said medium with a culture of P. freudenreichii, fermenting at a temperature between about 28 and about 32 degrees C. at a pH between about 6.5 and 7.2 for a period of several days under conditions of gentle agitation to develop substantial vitamin $B_{12}$ activity, centrifuging the whole culture, and drying the cell cream whereby to produce a product containing at least 50 milligrams of vitamin $B_{12}$ activity per pound of dried product.

5. A method of producing physiologically active vitamin $B_{12}$ compounds which comprises providing an aqueous medium containing as essential ingredients inverted molasses and a yeast product, the molasses comprising from about 4% to about 18%, and the yeast product being present in amount to provide an amino nitrogen content of about 0.048% to about 0.24%, said percentages being by weight of the medium, inoculating said medium with a culture of P. freudenreichii, fermenting at a temperature of about 30 degrees C. and a pH of about 6.5 to 7.2 for a period of several days under conditions of gentle agitation to develop vitamin $B_{12}$ activity, and then centrifuging the whole culture.

6. A method of producing physiologically active vitamin $B_{12}$ compounds which comprises providing an aqueous medium containing as essentially its sole ingredients inverted molasses and waste brewer's yeast autolysate, the molasses comprising from about 8% to about 12%, and the yeast autolysate solids comprising from about 2% to about 3%, said percentages being by weight of the medium, inoculating said medium with a culture of P. freudenreichii, and fermenting for a period of several days under conditions of gentle agitation to develop substantial vitamin $B_{12}$ activity.

7. A method of producing physiologically active vitamin $B_{12}$ compounds which comprises providing an aqueous solution containing as essentially its sole ingredients molasses and waste brewer's yeast autolysate containing invertase, inverting said molasses by means of said invertase whereby to produce a medium with inverted molasses comprising from about 4% to about 10%, with the yeast autolysate solids comprising from about 2% to about 3%, said percentages being by weight of the medium, inoculating said medium with a culture of P. freudenreichii, fermenting at a temperature between about 28 and about 32 degrees C. at a pH of about 6.5 to 7.2 for a period of about 3 to about 4 days under conditions of gentle agitation to develop substantial vitamin $B_{12}$ activity, centrifuging the whole culture, washing the bacterial cells with water, recentrifuging, and then drying said washed bacterial cells to produce a dried product containing at least 50 milligrams of vitamin $B_{12}$ activity per pound of said dried product.

8. A method of producing physiologically active vitamin $B_{12}$ compounds which comprises providing an aqueous medium containing as essentially its sole ingredients inverted molasses and waste brewer's yeast autolysate, the molasses comprising from about 8% to about 12%, and the yeast autolysate solids comprising from about 1% to about 5%, said percentages being by weight of the medium, inoculating said medium with a culture of P. freudenreichii, and fermenting for a period of several days under conditions of gentle agitation and while maintaining the pH between about 6.5 and about 7.2 and the temperature between about 28 and about 32 degrees C. to develop substantial vitamin $B_{12}$ activity.

9. A method of producing physiologically active vitamin $B_{12}$ compounds which comprises providing an aqueous medium containing as essentially its sole ingredients inverted beet molasses and waste brewer's yeast autolysate, the beet molasses comprising from about 8% to about 12%, and the yeast autolysate solids comprising from about 2% to about 3%, said percentages being by weight of the medium, inoculating said medium with a culture of P. freudenreichii, fermenting while gently agitating the medium and maintaining it at a pH within the range of about 6.5 to about 7.2 and at a temperature in the range of about 28–32 degrees C. for a period of several days to develop substantial vitamin $B_{12}$ activity, centrifuging the whole culture, and drying the cell cream.

References Cited in the file of this patent
UNITED STATES PATENTS 2,715,602     Hargrove et al. _____ Aug. 16, 1955